United States [11] 3,621,261

[72] Inventors Frank T. Princiotta;
 Harold N. Barr, both of Baltimore, Md.
[21] Appl. No. 813,489
[22] Filed Apr. 4, 1969
[45] Patented Nov. 16, 1971
[73] Assignee The United States of America as represented by the United States Atomic Energy Commission

[54] RADIOISOTOPE FUEL CAPSULE
9 Claims, 3 Drawing Figs.

[52] U.S. Cl. ........................................ 250/106 S,
 250/108 R, 250/108 WS
[51] Int. Cl. ........................................ G21h 5/00
[50] Field of Search ........................................ 250/108
 WS, 108 R, 106 S, 106 R; 136/202

[56] References Cited
UNITED STATES PATENTS

| | | | |
|---|---|---|---|
| 2,727,996 | 12/1955 | Rockwell | 250/108 WS |
| 2,726,339 | 12/1955 | Borst | 250/108 WS |
| 3,151,364 | 10/1964 | Glaser et al. | 250/108 R |
| 3,204,103 | 8/1965 | Johnson et al. | 250/106 S |

*Primary Examiner*—Archie R. Borchelt
*Assistant Examiner*—D. C. Nelms
*Attorney*—Roland A. Anderson ABSTRACT: A radioisotope fuel capsule having a radioisotope heat source encapsulated by a bimodal thermal insulator comprising a porous insulating layer with a material of higher thermal conductivity and lower melting point than the porous insulating layer disposed in the insulating layer.

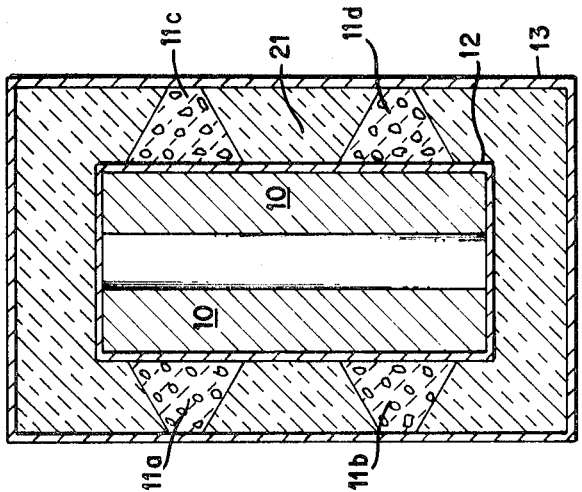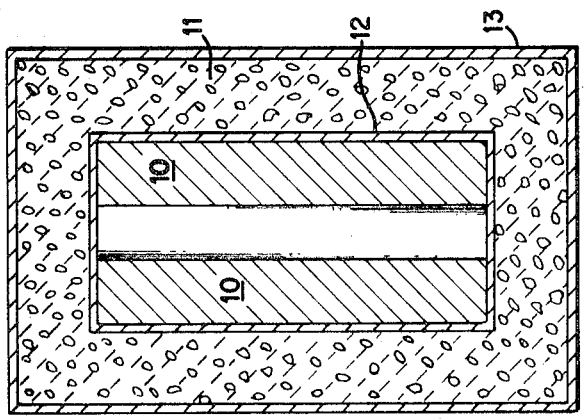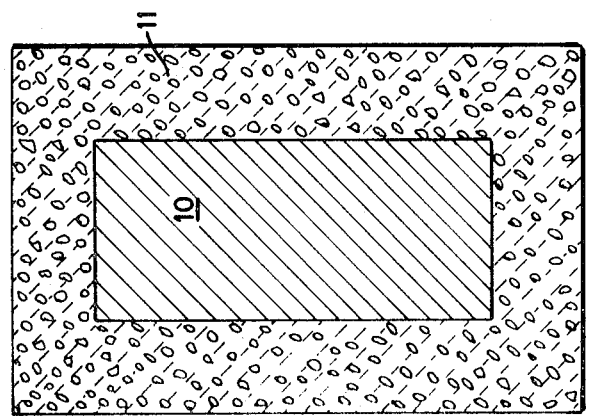

RADIOISOTOPE FUEL CAPSULE

BACKGROUND OF THE INVENTION

The present invention pertains to radioisotope fuel sources and more particularly to their encapsulation to protect them from thermal destruction particularly in connection with space applications.

Radioisotope fuel sources upon radioactive decay liberate heat energy. This heat energy can be converted to electrical energy in electric generators, for example, of the type described in U.S. Pat. Nos. 3,296,032—Belofsky; 3,329,532—Austin, et al., 3,347,711—Banks, Jr., et al.; and 3,357,866—Belofsky. Heretofore, the radioisotope heat source has been encapsulated inside a suitable layer of a thermally conductive material and placed in thermal contact with the electric conversion system of the electric generator.

An important use of radioisotope electric generators is in the space vehicle field. A major problem in connection with the use of radioisotope electric generators for space applications, particularly space applications involving reentry into the earth's atmosphere, has been the restraints imposed by radiological safety considerations. In order to prevent radioactive contamination it is important to have the radioisotope in a capsule which will maintain its integrity under very severe conditions including the high temperatures attendant upon reentry into the earth's atmosphere or upon a rocket-launching catastrophe. Conventional high-temperature insulation for the capsule cannot, however, be used because during normal operation it is necessary to permit the much lower temperature heat generated by the radioisotope heat source to reach the electric conversion system of the electric generator. Thus, any protective insulation of the radioisotope fuel source must allow normal heat flow during normal operation but prevent destructive heat flow when the capsule is subjected to very high temperatures.

It is therefore an object of this invention to provide protective encapsulation for a radioisotope fuel source that will allow normal heat flow from the source during operation but terminate or inhibit destructive heat flow to the source when it is subject to high external temperatures.

Other objects of this invention will be apparent from the description of the invention.

SUMMARY OF THE INVENTION

This invention describes a radioisotope fuel capsule wherein a radioisotope heat source is encapsulated with a porous insulating layer having a material of greater thermal conductivity and a lower melting point than the porous insulating layer disposed in at least a portion of the pores of the insulating layer.

The term radioisotope fuel capsule includes both the radioisotope fuel source and it protective encapsulation. The radioisotope fuel source used in this invention may include any radioisotope fuel conventionally used or capable of being used in electric generators. Typical isotopes employed are plutonium 238, polonium 210, curium 244, strontium 90 and cobalt 60.

It has been found in accordance with this invention that a radioisotope heat source encapsulated within an insulating porous layer, preferably of a material such as porous alumina, silica, zirconia or carbon, and having a conductor material of higher thermal conductivity and lower melting point than the porous insulating layer disposed in the pores thereof, provides a radioisotope fuel capsule that will allow heat flow from the radioisotope heat source during normal operation, but will terminate or inhibit heat flow when it is subjected to excessively high temperatures. The term excessively high temperatures is employed to denote temperatures of externally applied heat at which the integrity of the capsule is endangered. In the capsule of the present invention at excessively high temperatures the heat flow is terminated or inhibited because as the temperature of the capsule rises, the conductor material disposed in the porous ceramic will melt and tend to "ball-up" or escape, leaving the porous insulating layer to protect the radioisotope fuel source from excessive heat.

"Balling-up" is defined as that phenomenon which involves the breaking up of the continuous solid matter into small discrete droplets at the melting point of the solid material thus disrupting the continuous path of thermal conductivity through the bimodal insulator.

The nature of this invention will become better understood by reference to the following detailed description when considered in connection with the accompanying drawings wherein:

FIG. 1 is a longitudinal sectional view of a preferred embodiment of the radioisotope fuel capsule of this invention.

FIG. 2 is a longitudinal sectional view of a third embodiment of the radioisotope fuel capsule of this invention.

FIG. 3 is a longitudinal sectional view of a third embodiment of the radioisotope fuel capsule of this invention.

Referring now to the drawings in detail, FIG. 1 provides a cylindrical radioisotope fuel source 10, encapsulated by a porous insulating layer 11, having a solid material of higher thermal conductivity than the ceramic continuously disposed within pores of the porous ceramic 11. In this embodiment, the material disposed in the porous ceramic has a melting point greater than the operating temperature of the radioisotope fuel capsule to prevent escape of the material during operation, and which would render the capsule inoperative.

In operation, the radioisotope fuel capsule supplies heat to the energy conversion system. Heat generated by the decay of the radioisotope in the fuel source is conducted through the insulating layer by the conductor material continuously disposed in the pores of the insulating layer to the energy conversion system where it is converted into electricity.

If the radioisotope fuel capsule becomes subjected to excessively high temperature, that is, temperatures above the melting and boiling points of the material disposed in the porous ceramic, the material disposed within the porous ceramic will reach its melting point, then "ball-up" and leave a thermally insulating ceramic layer to protect the radioisotope fuel source from excessively high temperatures, and thus avoid the thermal destruction of the fuel source.

In FIG. 2 a more versatile and preferred embodiment of this invention is described. Therein a cylindrical radioisotope fuel source 10 is encapsulated by a porous ceramic layer 11 having a material of higher thermal conductivity than the ceramic disposed within the porous ceramic. Inner cladding 12 and outer cladding 13 are of a thermally conductive material, having a melting point greater than the operating temperature of the radioisotope fuel capsule. Inner claddding 12 hermetically encloses the fuel to prevent any escape of radioactivity from the radioisotope fuel source 10. The fuel source 10 is annular to provide a space for the accumulation of helium during use. With the porous ceramic layer hermetically enclosed, solids, liquids and gases of higher thermal conductivity than the porous ceramic may be used as the material disposed within the porous ceramic. Inner and outer claddings 12 and 13 may be of any high temperature thermally conductive material similar to those previously used to encapsulate radioisotope heat sources. If the radioisotope fuel capsule becomes subjected to excessively high temperatures for any reason such as from heat pulses on reentry, cladding 13 will be burnt off as the surface temperature exceeds its melting point and will allow the material disposed within the porous ceramic to escape leaving a nonconductive porous ceramic layer to protect the radioisotope fuel source from the excessively high temperatures.

Similarly, in FIG. 3 a cylindrical radioisotope fuel source 10, encapsulated by a porous unimpregnated ceramic layer 21, portions of which, plugs 11a, 11b, 11c, and 11d have a material of higher thermal conductivity than the ceramic disposed within the porous ceramic of the plugs. Inner cladding 12 and outer cladding 13 are of a thermally conductive material having a melting point greater than the operating temperature of the radioisotope fuel capsule and hermetically enclose the porous ceramic layer to prevent reactions with the radioisotope fuel source and the escape of the material disposed in the porous ceramic, respectively.

The operation of this embodiment, FIG. 3, is quite similar to that of FIG. 2 except the path available for conduction of heat from the radioisotope fuel source during operation is restricted.

Neither the radioactive isotope used in the fuel source nor the form in which it is incorporated is critical to the present invention. All radioactive isotopes generate heat by radioactive decay. Typical isotopes which may be employed are plutonium 238, polonium 210, curium 244, strontium 90, and cobalt 60.

The insulating layer may be made of any porous material which will provide thermal insulation in an amount sufficient to protect the capsule against thermal destruction by the excessive heat to which the capsule may be subjected. Ceramic material such as alumina, zirconia, silica, and graphite appear the most desirable. The term "ceramic" or "ceramic material" as used in the present application is defined to include carbon and graphite materials. Porous ceramic material of this type whether naturally or artificially prepared may suitably be employed as the ceramic layer. Ceramics with interconnecting pores are preferred because the impregnant is more readily introduced into the pores and more readily removed from the ceramic layer by melting or vaporization during periods of excessive heat. Other insulating materials such as asbestos, glass fibers, magnesia, etc., may also be employed.

The thermally conductive material dispersed in the pores of the insulating layer may be either a gas, a liquid or a solid. In the embodiment shown in FIG. 1, a material which is a solid at the temperature of operation of the radioisotope heat source would be used since a "balling-up" of the liquid above the melting point is required. A compatible material, more thermally conductive than the insulation layer, may be used provided it has a melting point between the operational temperature of the capsule and the excessive temperature from which the capsule is to be protected. Preferred solids are the highly thermally conductive metals such as silver, copper, gold, nickel, platinum, rhodium and their alloys, particularly silver-copper alloys.

The solids may be introduced to the porous ceramic bodies by pressure impregnation of the insulating material at temperatures somewhat above the melting temperature of the impregnant. For example, silver may be impregnated into foamed zirconia, alumina, etc., at about 1,150° C., copper at 1,290° C. and silver-copper alloy at 1,000° C. The metal impregnant and the porous ceramic may be contained in a graphite die body with close-fitting end punches. The assembly is heated to required impregnation temperature, and pressure is applied to a punch forcing the punch into the die cavity and the enclosed molten metal into the porous ceramic. The die body and the materials are cooled and removed from the die cavity and assembled with the radioactive fuel element. Partial impregnation of a porous ceramic with the solid conductor can also be accomplished by a vacuum impregnation technique. For example, where it is desired to use silver as an impregnant a water solution of silver salt, for example, silver nitrate, may be vacuum impregnated into the ceramic and the silver nitrate then converted to metal by reduction with hydrogen at 200° C., followed by sintering at 700° C. Partial impregnation may be accomplished in a single cycle and increasing degrees of impregnation may be obtained by repeating the process.

Partial impregnation of the metal in the porous ceramic may be used in the radioisotope fuel capsule because it has been found that the metal during the initial stages of excessive heating tends to conglomerate into small particles, thus changing the continuous metal path from the center of the capsule to the outer surface of the capsule, drastically lowering the thermal conductivity without the requirement of the metal being expelled from the capsule. Other methods of forming porous insulating bodies containing thermally conductive solid material in the pores may also be employed such as various ceramic, powder metallurgy and cermet techniques.

The inner and outer claddings may be made of any thermally conductive materials having a melting point higher than the operating temperature of the capsule and capable of being fabricated into hermetically tight structures of sufficient strength to withstand the pressures and stresses of operation. Superalloys, stainless steels, refractories, and precious metals may be used. Alloys having high strength at elevated temperatures, are preferred. When an outer cladding is employed with the capsule, gases, liquids and solids having low melting points may be employed as the thermally conductive impregnant. In such cases the outer cladding is made sufficiently thin that it will be destroyed by the excessive temperature permitting the impregnant to escape.

Gases may be disposed in the porous ceramic layer by gaseous impregnating techniques available in the art. A typical method would be to place the porous ceramic layer after encapsulation of the radioisotope fuel source in a chamber, evacuate and pressurize with the impregnating gas, and while maintaining the gas pressure, hermetically enclosing the gas-impregnated porous ceramic layer with a high-temperature thermally conductive material. Examples of gas which may be used are inert gases such as helium and mixtures such as helium-neon.

Liquids may be disposed in the porous ceramic layer by vacuum impregnation or other techniques available in the art. A chamber containing the liquid to be disposed in the porous ceramic and the porous ceramic layer is evacuated to remove air from the chamber and the pores of the porous ceramic. The evacuated porous ceramic layer is then lowered below the surface of the liquid. The vacuum is released and air pressure applied to further drive the liquid into the porous ceramic. The impregnated ceramic is raised and excess liquid is allowed to drain while the vacuum is released. The impregnated porous ceramic layer may then be hermetically enclosed with a high-temperature thermally conductive material. The enclosed porous ceramic layer may then be used to encapsulate the radioisotope fuel source. Examples of liquids which may be used are sodium (melting point 97.5° C.) and a sodium-potassium eutectic alloy, 75 wt. percent potassium—25 wt. percent sodium (melting point 12.5° C.).

In a preferred embodiment a radioisotope fuel source was clad with an inner cladding of a cobalt alloy having 10 percent chromium, 15 percent tungsten and 10 percent nickel (percent by weight). The insulating layer was 0.64-inches-thick alumina having a density of 0.95 and 70 percent voids. The voids were impregnated with silver. The capsule was then clad with an outer cladding of the same alloy as the inner cladding.

While the embodiments of this invention described therein have been directed to cylindrical radioisotope fuel capsules, it should be readily apparent that this invention is not limited to a single geometry. Modifications and variations of the above description of this invention may be made within the scope of the appended claims.

We claim:

1. A radioisotope fuel capsule having an outer surface comprising a radioisotope heat source enclosed in a porous bimetal thermal insulating layer having a nonradioactive material of higher thermal conductivity incorporated in part of the porous layer, said material having a lower melting point than the porous layer and which material during normal operating conditions conducts heat from the heat source to the outer surface and which escapes during accident conditions leaving the porous insulating layer to protect the heat source.

2. The radioisotope fuel of claim 1 wherein the porous insulating layer is a ceramic material.

3. The radioisotope fuel capsule of claim 2 wherein porous ceramic material is selected from the group consisting of porous alumina, zirconia, silica and carbon.

4. The radioisotope fuel capsule of claim 1 wherein the nonradioactive material disposed in the porous insulating layer material is a metal which is solid during operational temperatures.

5. The radioisotope fuel capsule of claim 1 wherein the porous insulating layer and radioisotope heat source is hermetically enclosed in a layer of a high-temperature thermally conductive material.

6. The radioisotope fuel capsule of claim 5 wherein the nonradioactive material disposed in the porous ceramic layer is an inert gas.

7. The radioisotope fuel capsule of claim 5 wherein the nonradioactive material disposed in the porous ceramic is a metal which is solid during operational temperatures of the radioisotope fuel capsule.

8. The radioisotope fuel capsule of claim 1 wherein the radioisotope heat source is an annular body of plutonium 238 clad with a superalloy, and the insulating layer is porous alumina having a density of 0.95, impregnated with metallic silver and clad with a superalloy.

9. A method of protecting a heat source against excessive heat which comprises at least partially enclosing said heat source with a bimodal thermal insulator comprising a porous thermal insulator having a nonradioactive material of higher thermal conductivity incorporated in part of the porous layer, said material having a lower melting point than the porous layer and which material during normal operating conditions conducts heat from the heat source to the outer surface and which escapes during accident conditions leaving the porous insulating layer to protect the heat source.